US012460788B2

(12) United States Patent
Yudelevich et al.

(10) Patent No.: US 12,460,788 B2
(45) Date of Patent: Nov. 4, 2025

(54) ILLUMINATED SIGN DEVICE WITH REPLACEABLE LENS

(71) Applicant: SMARTREND MANUFACTURING GROUP (SMG), INC., Winnipeg (CA)

(72) Inventors: Michael Yudelevich, Winnipeg (CA); Michael McDonald, Winnipeg (CA); Vladimir Kotlyar, Winnipeg (CA); Aidan Degagne, Winnipeg (CA); Fisher Chaput, Winnipeg (CA)

(73) Assignee: SMARTEND MANUFACTURING GROUP (SMG), INC., Winnipeg (CA)

(*) Notice: Subject to any disclaimer, the term of this patent is extended or adjusted under 35 U.S.C. 154(b) by 0 days.

(21) Appl. No.: 18/820,786

(22) Filed: Aug. 30, 2024

(65) Prior Publication Data

US 2025/0075874 A1 Mar. 6, 2025

Related U.S. Application Data

(60) Provisional application No. 63/580,145, filed on Sep. 1, 2023.

(51) Int. Cl.

| | |
|---|---|
| ***F21S 43/50*** | (2018.01) |
| ***F21S 43/20*** | (2018.01) |
| ***F21S 43/27*** | (2018.01) |
| ***F21V 31/00*** | (2006.01) |

(52) U.S. Cl.

CPC .......... *F21S 43/50* (2018.01); *F21S 43/2605* (2024.05); *F21S 43/27* (2018.01); *F21V 31/005* (2013.01)

(58) Field of Classification Search

CPC .................................. F21S 43/27; F21S 43/50

See application file for complete search history.

(56) References Cited

U.S. PATENT DOCUMENTS 2,877,584 A * 3/1959 Dupree .................. B64D 45/00 40/574

6,050,013 A * 4/2000 Heaton .................. G09F 13/04 40/574

11,170,673 B2 11/2021 Gamble et al.

OTHER PUBLICATIONS

Innovation Q+ (Year: 2024).*

* cited by examiner

*Primary Examiner* — Anabel Ton

(74) *Attorney, Agent, or Firm* — Brooks Kushman P.C.

(57) ABSTRACT

A sign device is disclosed. The device includes a mounting frame for mounting a light box to a surface of a vehicle; a lens frame for coupling to the mounting frame and movable between an open position and closed position; and a removable lens retainable by the lens frame such that, when the light box is activated with the lens frame in the closed position, the light box back lights the lens. In the closed position, a seal seals a space between the lens and the light box.

20 Claims, 13 Drawing Sheets

ILLUMINATED SIGN DEVICE WITH REPLACEABLE LENS

CROSS-REFERENCE TO RELATED APPLICATION

The present application claims priority to U.S. Provisional Patent Application No. 63/580,145, filed Sep. 1, 2023, the contents of which are incorporated herein by reference in their entirety.

FIELD

The present disclosure relates generally to illuminated signs for mounting to vehicles, such as school buses or other passenger transport vehicles, or other purpose-specific vehicles. In particular, the present disclosure relates to illuminated sign devices with replaceable lenses.

BACKGROUND

Various methods are known for improving the visibility of signage used for vehicles, such as school buses, where identifying the purpose of the vehicle is critical for motorists. For example, one known solution is using a retroreflective backdrop surrounding black lettering and relying on exposure to external light sources such as streetlights or headlights of other vehicles. Other known solutions require providing an opening within the vehicle shell to accommodate lighting that backlights a grommet-mounted lens within the shell.

It may also be desirable to alter the indicia or signage on the vehicle from time to time. For example, a school bus operator may wish to replace the words "SCHOOL BUS" with signage indicating "ACTIVITY BUS" if the bus is not being used as a school bus for a given activity. Current methods of providing both an illuminated signage, which also permits replacement of the indicia on the sign on the vehicle have drawbacks. For example, while a grommet mounted lens can be switched out, this requires providing a large cavity in the shell, which is labor intensive and has proven difficult to weather seal effectively.

Accordingly, improvements to illuminated signage with replaceable lenses and/or indicia are desirable.

BRIEF DESCRIPTION OF THE DRAWINGS

Embodiments will be described, by way of example only, with reference to the accompanying figures wherein.

DETAILED DESCRIPTION

For illustrative purposes, specific embodiments will now be explained in greater detail below in conjunction with the figures.

The following description describes embodiments according to the present disclosure in detail. It is to be understood that, while many embodiments are described as a sign for school buses or other similar activity vehicles, the principles described and disclosed herein may be applicable to a variety of illuminated signs used on vehicles, including, but not limited to, trucks (including ambulances and fire trucks), cars (including taxis), boats, ships, airplanes, etc. Thus, use of the terms bus, "school bus", "school bus sign" and other similar terms are not to be limiting of the scope of the present disclosure unless where specifically indicated. Moreover, it is understood that the indicia SCHOOL BUS are exemplary and other indicia could be used.

It may be desirable to have an illuminated sign mounted to vehicles that allows for replacement of the indicia of the sign, without needing to change the entirety of the sign, which may be securely mounted and weather-sealed. Additionally, it may be desirable to be able to replace the indicia of the sign in an ergonomic manner, with fewer tools or components, or without a significant time investment, or without requiring the expertise of professionals, such as mechanics or handymen.

FIGS. 1 to 7 illustrate a self-contained illuminated sign device 100 according to one embodiment of the present disclosure, which can be mounted to the shell of a vehicle, such as a school bus. The sign device 100 is configured to contain a replaceable sign lens with indicia thereon, such as indicia indicating the type or purpose of the vehicle, or a destination of the vehicle. Possible indicia may also include a continuous opaque surface to indicate that the vehicle is not being used for any particular purpose.

Figure 1:
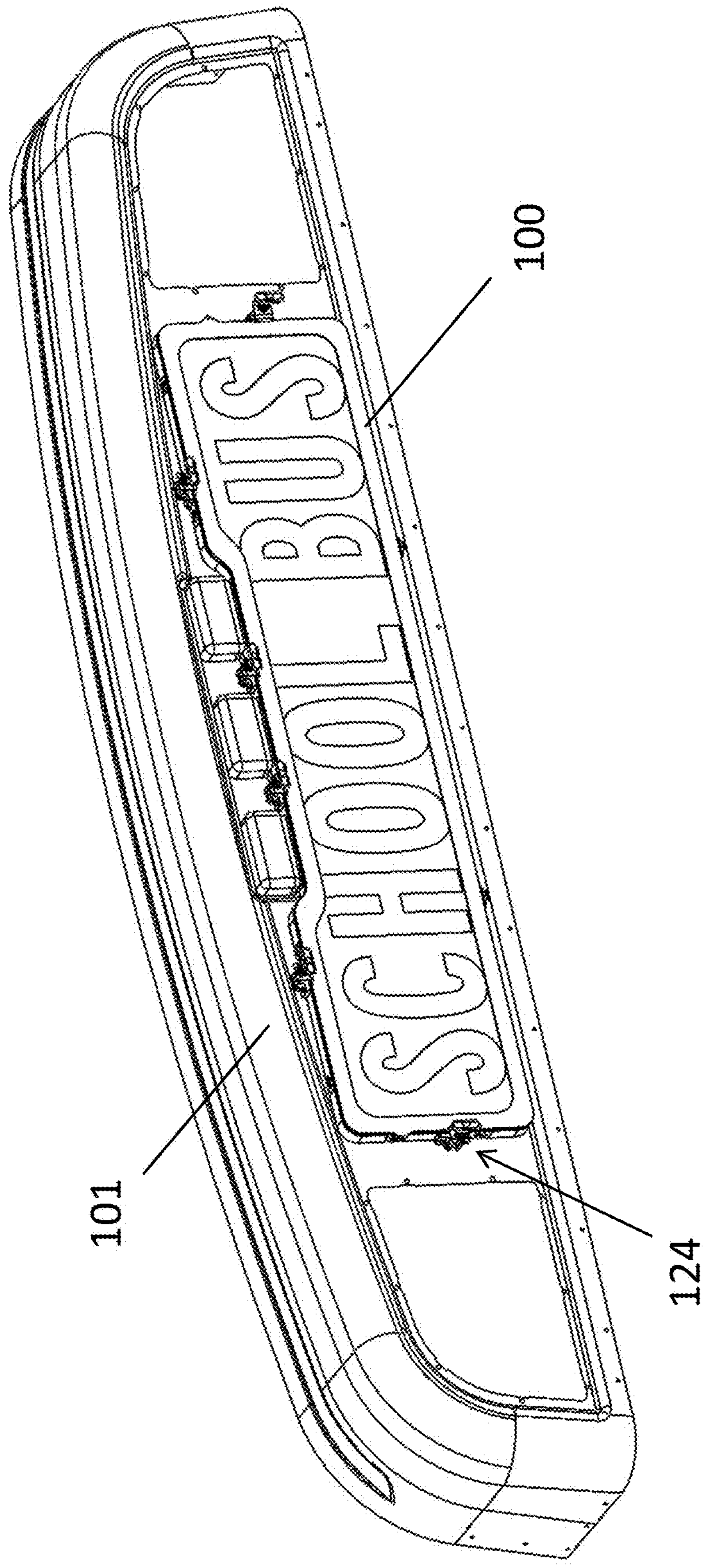
FIG. 1 is a perspective view of a self-contained illuminated sign device according to embodiments of the present disclosure mounted on a bulkhead of a vehicle.

FIG. 1 is a perspective view of the self-contained illuminated sign device 100, according to one embodiment. In the illustrated embodiment, the sign device 100 displays the indicia SCHOOL BUS and is mounted onto a bulkhead of a school bus, a portion 101 of which is illustrated in FIG. 1, as an example.

In the illustrated embodiment, the sign device 100 includes a mounting frame 110 and a lens frame 120, which is operably coupled to the mounting frame 110 and movable between a closed position and open position.

In the illustrated embodiment, a linkage or cable 130 is provided, linking the mounting frame 110 and the lens frame 120 to each other. The linkage may be omitted in some embodiments, discussed herein.

The mounting frame 110 and the lens frame 120 each have a structure shaped to generally conform and/or be generally complementary with a perimeter shape of a replaceable lens 300.

Figure 2:
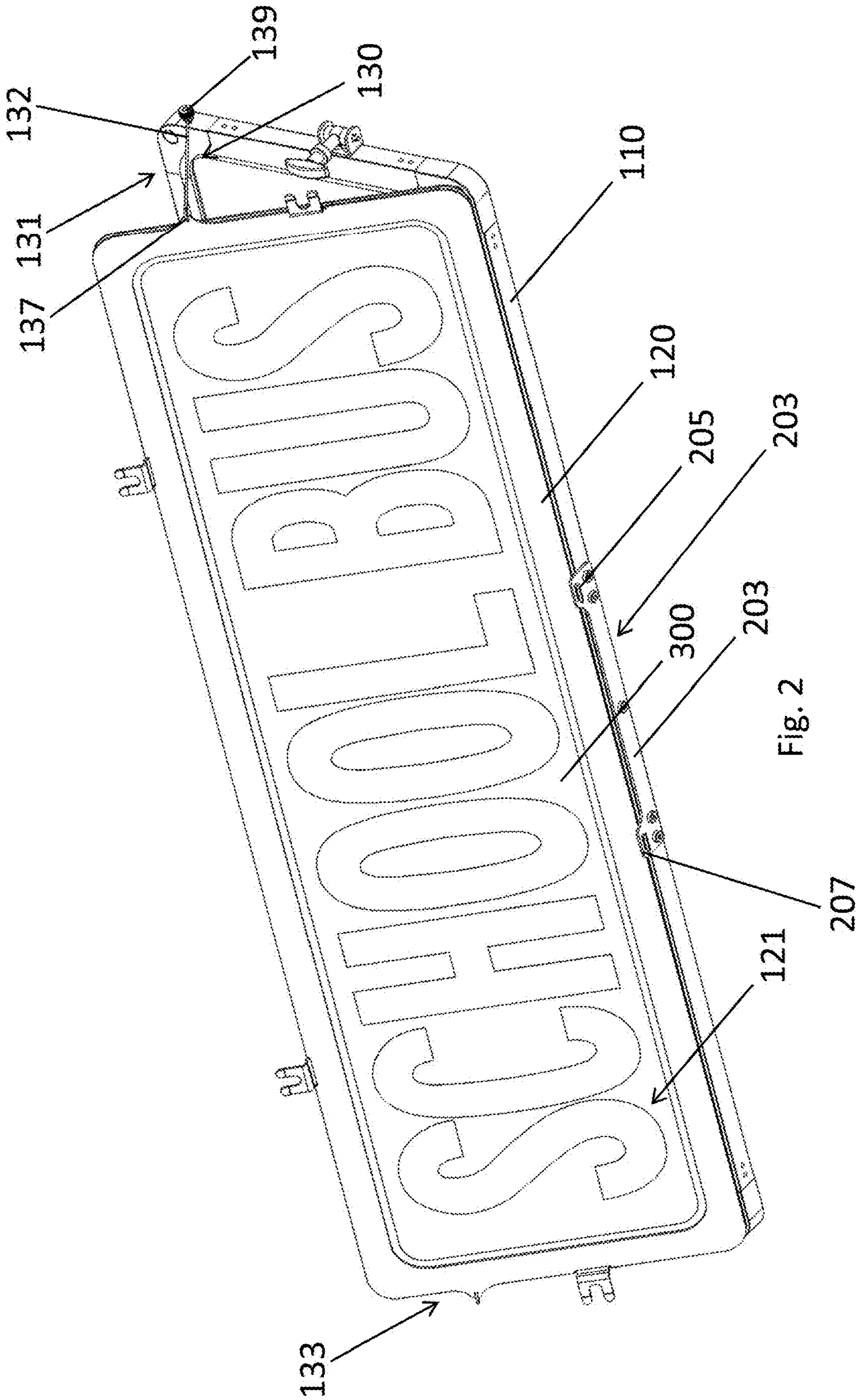
FIG. 2 is a perspective view of the sign device of FIG. 1 in an open configuration.

In the illustrated embodiment, the lens frame 120 may be moved between the open position and the closed position via a clamshell or hinge mechanism enabled by a hinge 202 and the linkage 130. In FIG. 2, the lens frame 120 is shown in an open position.

In the illustrated embodiment, the mounting frame 110 is comprised of multiple members 111 that are connected to form a frame generally matching the perimeter shape of the lens frame 120. However, the mounting frame 110 may be comprised of more or fewer elements, including a single piece frame.

Figure 4:
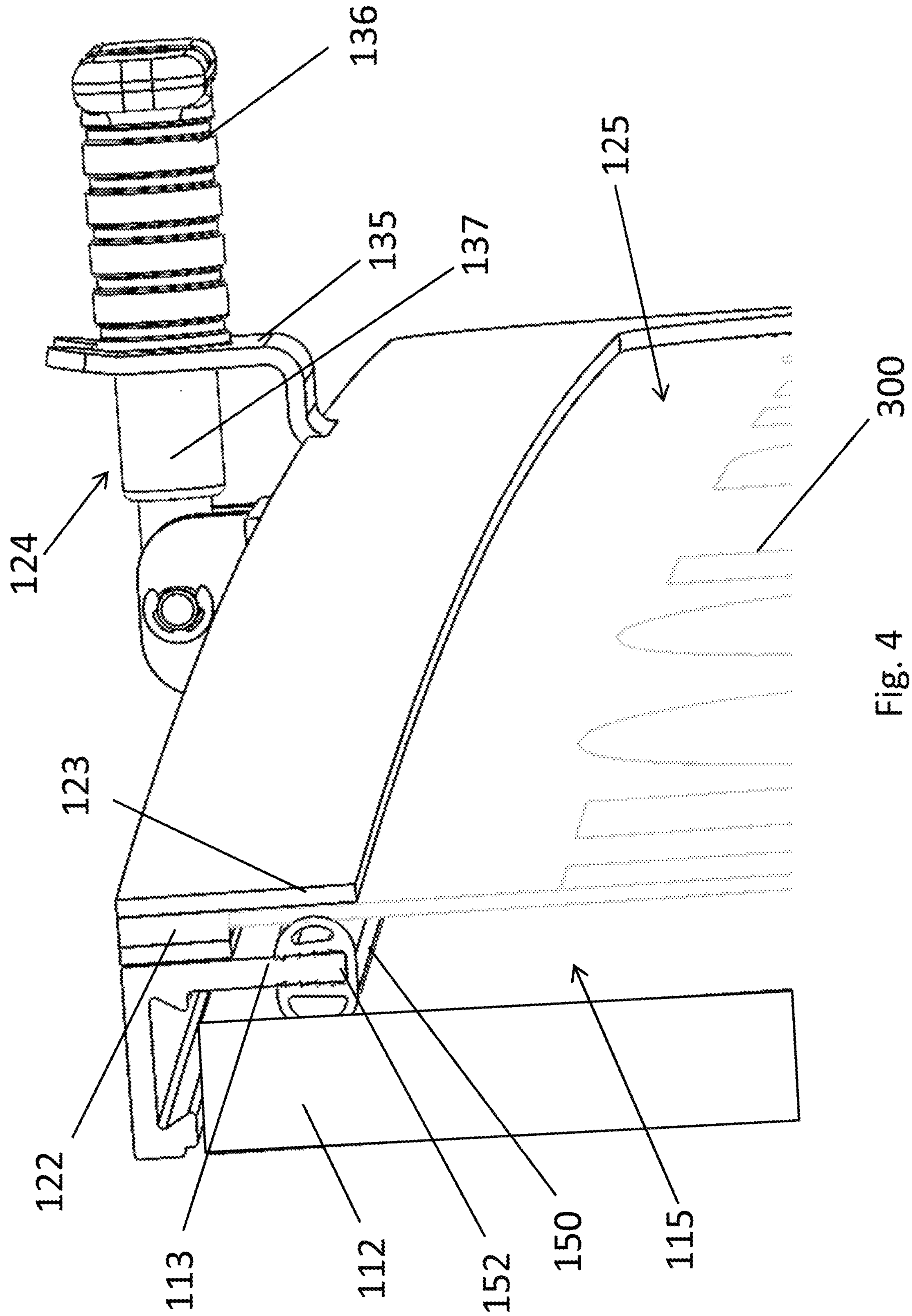
FIG. 4 is a partial sectional view of the sign device of FIG. 3.
Figure 5:
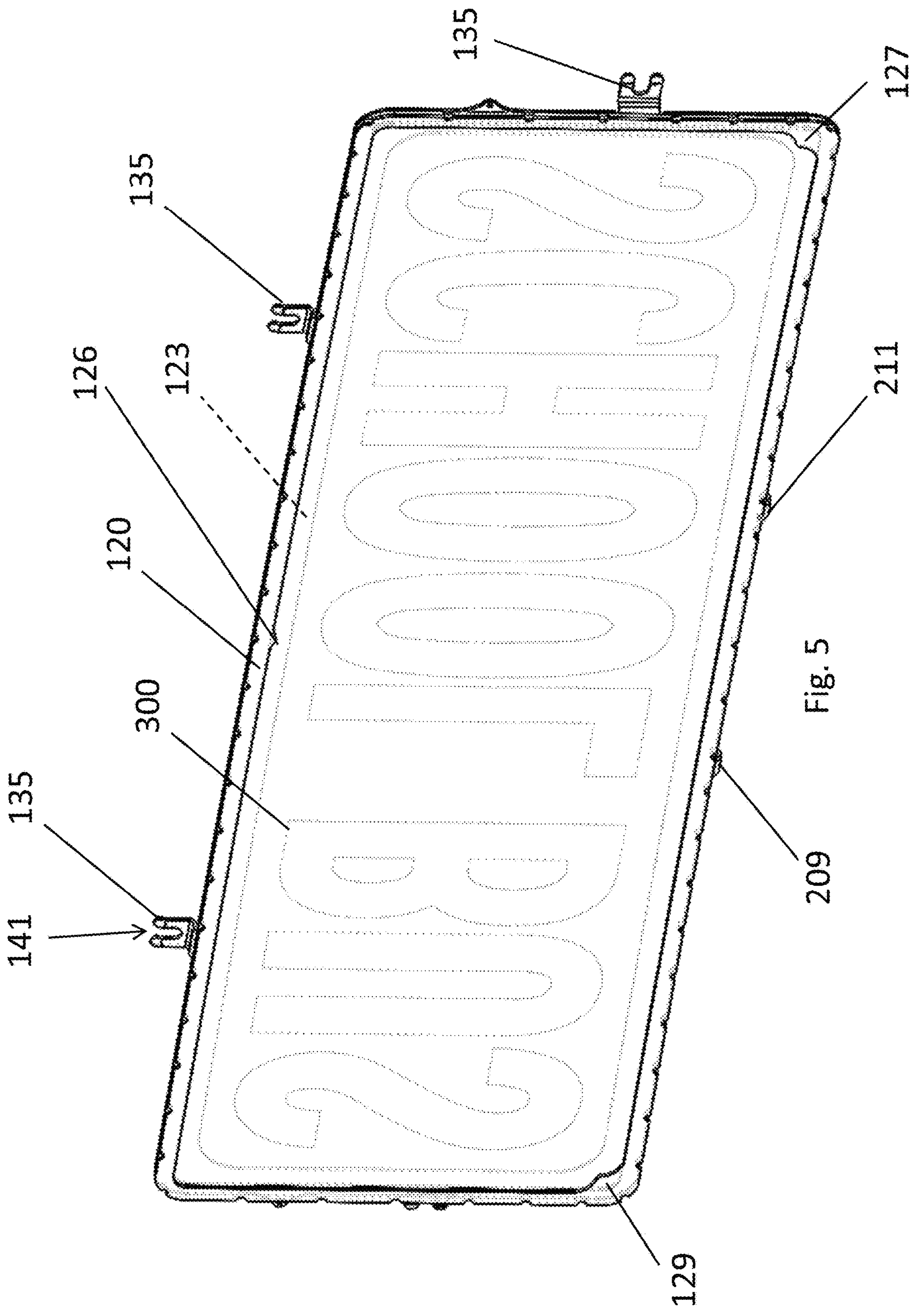
FIG. 5 is a rear perspective view of the lens and lens frame of the sign device of FIG. 1.
Figure 6:
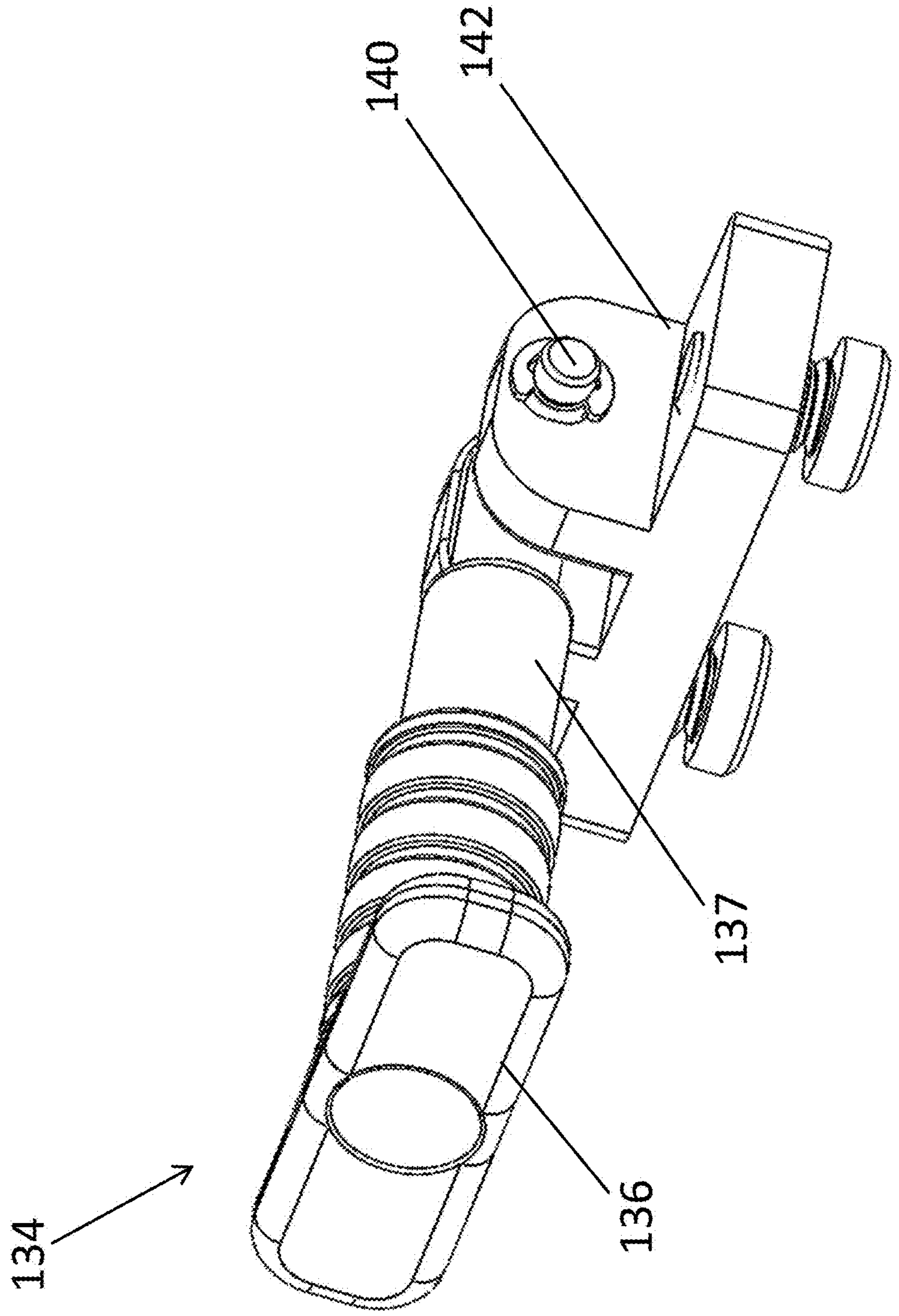
FIG. 6 is a perspective view of a latch of the sign device of FIG. 1.
Figure 7:
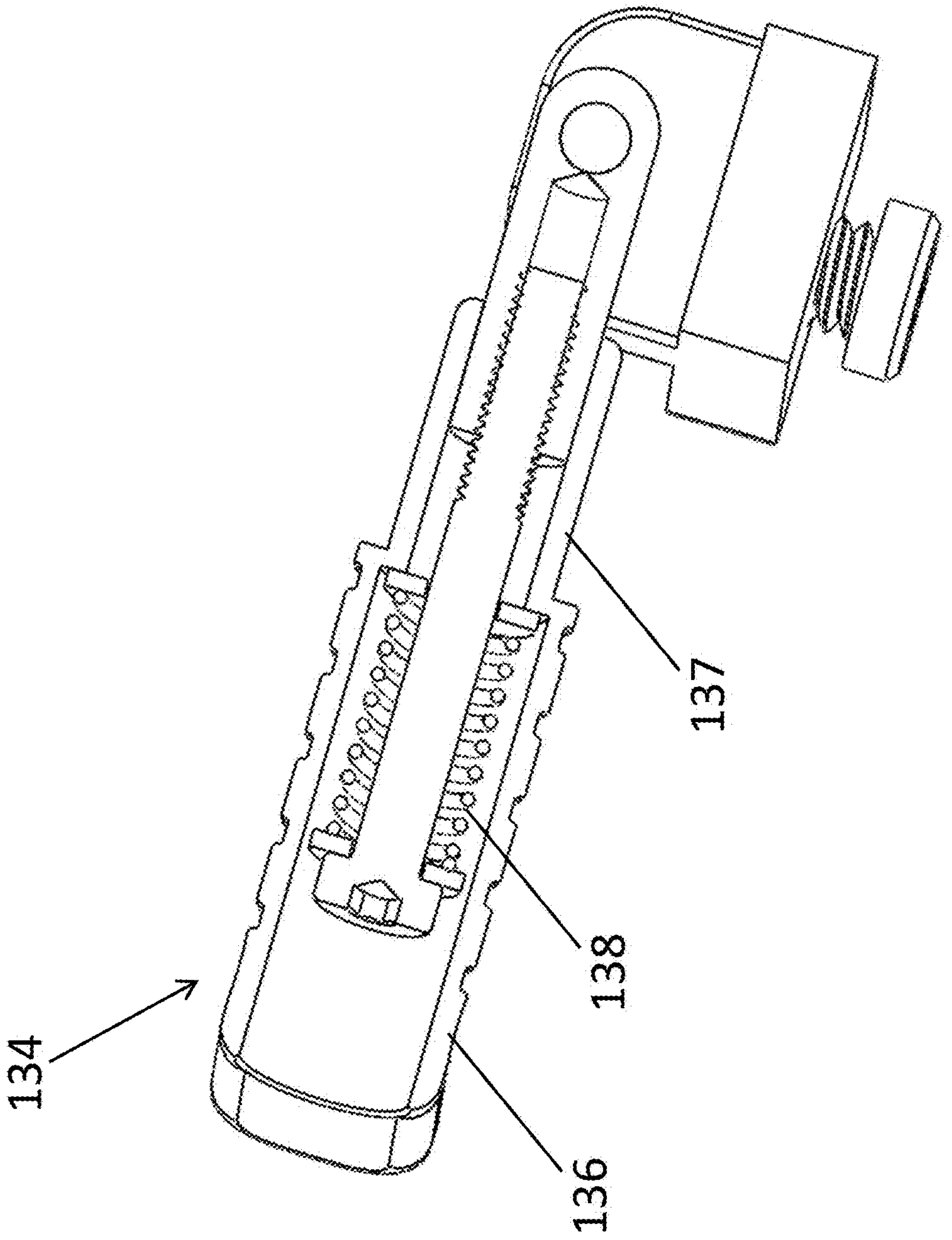
FIG. 7 is a cross-sectional view of the latch of FIG. 6.

As shown in FIG. 4., the frame 110 may have a generally L-shaped cross-section with an inwardly reaching leg 113 jutting inwardly toward an open space 115 defined by the mounting frame 110.

The mounting frame 110 may be used to mount a lighting unit, light box or similar, such as a self-contained illuminated LED unit for illuminating the sign device 100, to a surface of a vehicle. A generic example of a light box 112 is shown in FIG. 4. The light box 112 acts to generate a back light for the replaceable lens 300 to illuminate it when the light box 112 is activated and the lens frame 120 is in the closed position.

Some embodiments of a weather-sealed self-contained illuminated unit for use as a light box in the mounting frame 110 are disclosed in U.S. Pat. No. 11,170,673 (the '673 patent), which is hereby incorporated in its entirety by reference. Specifically, a light box 112 according to the '673 patent may be configured as a self-illuminated sign where the front panel is a clear sheet without indicia, for example a clear polycarbonate layer, which allows white light generated by the light box to emanate forward towards the replaceable lens 300.

Light boxes according to the '673 patent may be provided which have a clear or uniformly translucent or transparent front panel producing substantially homogenously diffused light emanating from a front of the unit that may then be coloured by a translucent replaceable lens, such as the lens 300 when used as part of the sign device 100 as described herein.

Other configurations and embodiments of the light box are possible.

The light box 112 may be provided and retained against a shell of the vehicle using the mounting frame 110. Specifically, the mounting frame 110 may be affixed to a surface of the bus, creating a gap between the leg 113 and the surface of the bus, with the light box 112 being secured between the leg 113 and the bus. The mounting frame 110 may be configured to extend around a perimeter of the light box 112 with the open space 115 allowing light from the light box 112 to emanate towards the replaceable lens 300 when activated.

While the illustrated embodiment shows a separate mounting frame 110 and separate light box 112, the present disclosure also covers embodiments where a mounting frame and light box are integral. Thus, the mounting frame and the light box need not be separate, including for light boxes as disclosed in the '673 patent. Moreover, the present disclosure covers embodiments where the light box includes a housing, tub, frame, border, or other equivalent element which allows the light box to be directly mounted to the surface of the bus without a separate mounting frame. All references herein to a mounting frame, unless specified, should be understood to also cover embodiments where the light box includes an integral frame or may otherwise be directly mounted to the surface of the bus. In such embodiments, the term mounting frame would refer to the element or portion of the light box used to mount the light box to the surface of the vehicle, regardless of its configuration.

In the illustrated embodiment, the lens frame 120 is comprised of multiple layers of sheet metal welded together to form a perimeter shape that generally matches the perimeter shape of the replaceable lens 300 and defines an opening 121 through which the indicia of the replaceable lens 300 are visible. In other embodiments, the lens frame 120 may be produced different, for example moulded from plastic.

The lens frame 120 may have a generally L-shaped cross section with a base portion 122 and leg 123 that extends parallel to a front surface of the replaceable lens 300. The leg 123 runs along the perimeter of the lens frame 120 defining an opening 125, smaller than the opening 121. The replaceable lens 300 is sized and dimensioned to be larger than the opening 125, being positioned on a side of the leg 123 facing the vehicle, which may be deemed the rear side of the leg.

In some embodiments, a clear and transparent front panel (not illustrated) may be situated or fixed in the lens frame 120 through which a replaceable lens may be visible when the lens is contained within the sign device 100. The clear and transparent front panel may help protect the replaceable lens from damage.

To retain the replaceable lens 300, in the illustrated embodiment, the lens frame 120 includes retention portions that extend from the lens frame 120 towards the opening 121 parallel to the replaceable lens 300 and leg 123, and spaced from the leg 123, to create a gap therebetween. The gap is sized to have a thickness complementary to a thickness of the replaceable lens 300. In the illustrated embodiment, the retention portions extend from corners of the lens frame 120 as corner portions 127 and 129. However, the retention portions may be larger or placed elsewhere. For example, a retention portion may extend along substantially all of one edge, such as the bottom edge, of a rear side of the lens frame 120 acting as a leg spaced from the leg 123.

A further retention portion, configured as a tab latch 126, is positioned on a rear side of the lens frame 120 and extends into the opening 121 to further retain the replaceable lens 300. As with the retention portions, the tab latch is spaced from the leg 123 and the resultant gap is complementary to the thickness of the replaceable lens 300. The tab latch 126 may be positioned opposite the retention portions to help anchor the replaceable lens 300 and space the points of retention. The tab latch 126 is sized and dimensioned to allow the replaceable lens 300 to be slightly deformed in order to pass by the tab latch 126 and be retained thereby.

Other configurations, placement, sizes, and/or dimensions of the tab latch are possible and within the present disclosure. There may be multiple such tab latches. If there are multiple tab latches, they need not all be the same.

In other embodiments, the lens may be retained by the lens frame in other ways. In some embodiments, the lens may be retained by the lens frame by affixing the lens to the lens frame, for example using fasteners, welding, gluing or with other means. Thus, the lens and lens frame may, in some embodiments, be considered integrated or integral and/or as a single unit.

In the illustrated embodiment, the replaceable lens 300 is placed into the lens frame 120 by first sliding or inserting the replaceable lens 300 into the gap between the corner portions 127 and 129 and the leg 123. The replaceable lens 300 is then slightly deformed to pass the tab latch 126 by applying pressure on the replaceable lens 300 in the area of the tab latch 126. Once the tab latch 126 is passed, the replaceable lens 300 resides in the opening 121 and is retained by the lens frame 120.

In reverse, the replaceable lens frame 300 is slightly deformed to pass the tab latch 126 and is then removed from the corner portions 127 and 129.

In this manner, the replaceable lens 300 may be easily and quickly inserted or removed from the lens frame 120.

In other embodiments, the replaceable lens may be retained in the lens frame differently, for example using fasteners or magnets.

Figure 3:
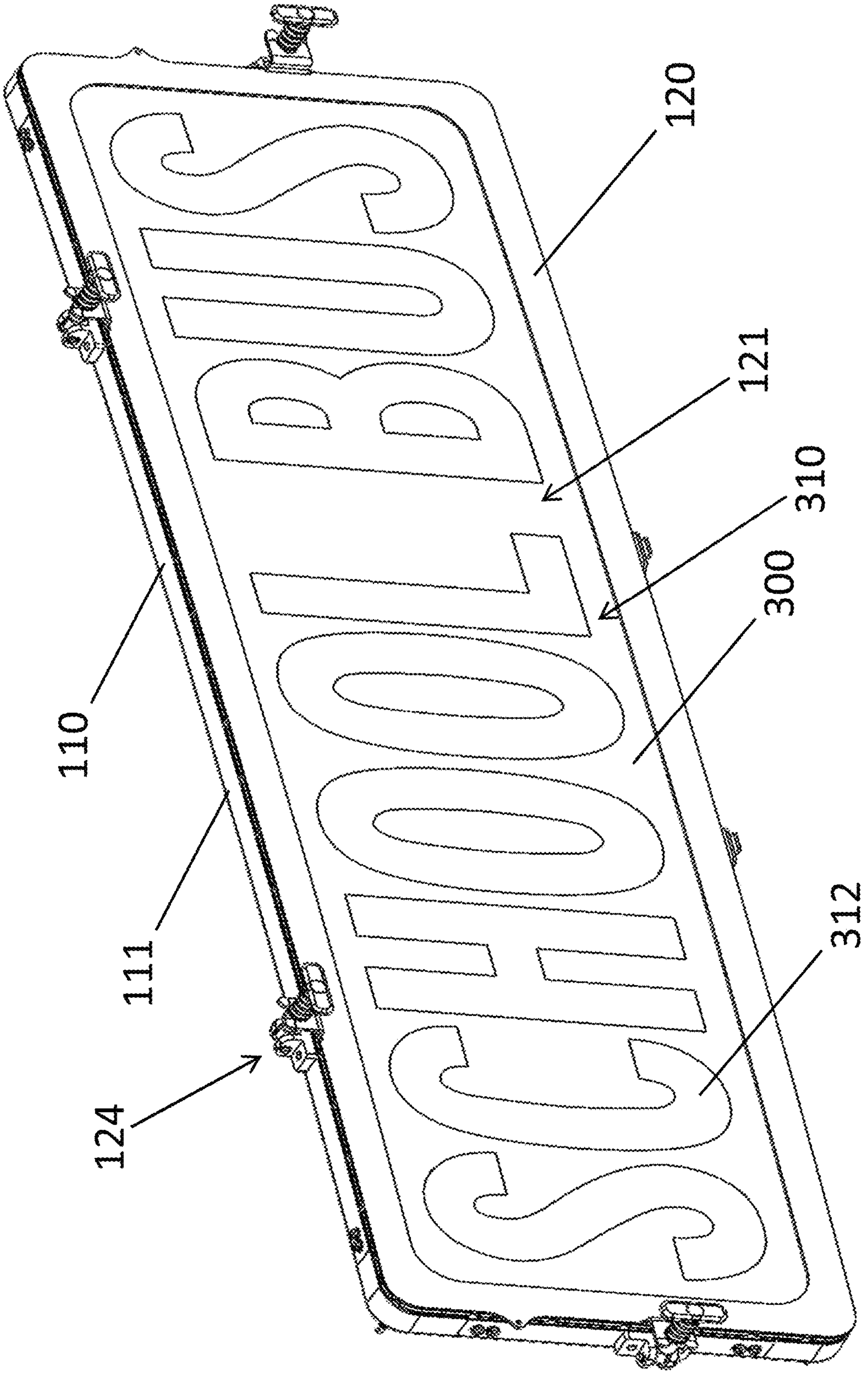
FIG. 3 is a perspective view of the sign device of FIG. 1 in a closed configuration.

The mounting frame 110 and the lens frame 120 may be pivotably coupled together by a hinge 202 and the linkage 130. The hinge 202 creates a hinge-joint about which the mounting frame 110 and the lens frame 120 can be pivoted relative to one another between the open position as illustrated in FIG. 2 and a closed position as illustrated in FIG. 3.

In the illustrated embodiment, the hinge 202 is comprised of a hinge plate 203 affixed to the mounting frame 110 with two slot-shaped openings 205 and 207, which receive respective tabs 209 and 211 that extend from a bottom edge of the lens frame 120. The tabs 209 and 211 are bent at a pre-determined angle. The openings 205 and 207 and the tabs 209 and 211, are configured to cooperate together to allow the lens frame 120 to pivot away from the mounting frame 110 to a predefined angle of pivot.

In other embodiments, the hinge may be configured, placed, sized and/or dimensioned differently. For example, the hinge may be configured as a standard hinge with leaves, connected to the mounting frame and lens frame, respectively, and a pin. There may be multiple hinges.

The linkage 130 is comprised of two opening limiters 131 and 133, each positioned on opposite sides of the sign device 100. Each opening limiter is comprised of a cable 132 that is connected to and extends between the lens frame 120 and the mounting frame 110. Specifically, in the illustrated embodiment, the cable 132 extends from a cable tab 137 extending from the lens frame 120 to a cable hold 139 connected to the mounting frame 110. A length of the cable 132 is predetermined to allow the lens frame 120 to pivot a desired amount around the hinge 202, while providing additional support to the lens frame 120 and the hinge 202. The linkage 130 also helps prevent a user from entirely removing the lens frame 120 from the hinge 202.

In other embodiments, the linkage 130 may be configured, placed, sized and/or dimensioned differently. For example, the linkage 130 may be configured as a linkage of links that are hinged or otherwise connected.

In some embodiments, the linkage and/or hinge may be omitted and a different mechanism used to move the lens frame between the open and closed positions.

In some embodiments, the hinge 202 and/or the linkage 130 may be adjusted to fit confined mounting spaces and complex geometries. For example, the hinge 202 and/or linkage 130 may be modified so that the greatest angle of opening is an acute angle. As another example, a sign device having a more complex geometry may lead to the addition of linkages 130 or hinges 202. The linkage and hinge may be configured to accommodate different curvatures and/or geometries of the sign device.

A latch mechanism 124 may be provided to secure the lens frame 120 to the mounting frame 110 in the closed position. In the illustrated embodiment, the latch mechanism 124 includes multiple latches 134, which are arranged on the mounting frame 110 and engage a respective one of multiple U-shaped projections or tabs 135 on the lens frame 120. In the illustrated embodiment, the latch 134 is configured as a spring-loaded latch with a latch hook 136 that is pulled to compress an internal, biased spring 138 and then released once a shaft 137 of the latch 134 is seated in the respective groove 141 of the tab 136. The latch hook 136 is pivotable about a pivot 140 of a body 142 of the latch 134. The body 142 is affixed to the mounting frame 110, for example screwed or bolted to the mounting frame 110.

In the illustrated embodiment, four latches 134 are arranged around the perimeter of the sign device 100. Other configurations, numbers and/or placement of the latches are possible. In other embodiments, the latch mechanism may be configured differently.

One or more seals may be provided within the sign device 100 to improve weather proofing of the sign device 100. Specifically, in the illustrated embodiment a rubber gasket or seal 150 is positioned between the replaceable lens 300 and the light box 112.

In the illustrated embodiment, the seal 150 is positioned on a portion of the mounting frame. Specifically, the seal 150 is positioned on the rear and front surfaces of the leg 113 of the mounting frame 110. More specifically, the seal 150 includes a channel 152 that receives the leg 113 and thus the leg 113 is seated in the seal. The seal 150 extends around the open space 115 to seal the open space 115. This may aid in preventing water, dirt or other undesirable elements to enter into the open space 115 during operation and impair functioning of the sign device 100.

The sign device is configured such that the lens frame is capable of being secured to the mounting frame in the closed position such that the seal is subject to compression between the replaceable lens 300 and the light box 112. The seal 150 is made of a compressible material. In the illustrated embodiment, the force applied by the latch mechanism against the lens frame 120 to secure it to the mounting frame 110 in turn aids in compressing the seal 150 between the replaceable lens 300 and the light box 112, which aids in ensuring a weather tight seal.

The seal 150 is positioned and configured such that it does not require replacement when the replaceable lens is replaced or switched for a different lens.

In other embodiments, the open space 115 may be sealed using different scaling options, such as a seal applied directly to the light box. In some embodiments, the seal 150 may be configured differently or omitted. The seal 150 may be comprised of multiple components or may not extend around an entirety of the open space 115. In some embodiment, the seal 150 may be comprised of two components, one sealing between the leg 113 and the light box 112 and a second component sealing between the lens 300 and the leg 113.

The lens 300 includes a front display area 310 having opaquely masked areas forming blacked-out indicia 312. The indicia 312 are surrounded by an area which may be tinted in yellow, white or other colour of notable contrast to the indicia 312. This area surrounding the indicia 312 may be transparent or translucent. In the illustrated example, the indicia 312 spell out the words “SCHOOL BUS”. Other examples of indicia that may be commonly used include “ACTIVITY BUS”, typically denoting a school bus that is used to transport students for extracurricular activities, field trips, sporting events, etc., where the students are loaded and unloaded only at specific start and stop destinations, as opposed to road-side student pickups and drop offs that occur on a daily scheduled school bus route. Another example of suitable sign indicia is “ECOLIERS”, the French language term used for school bus signage, which generally translates to “students”. Other indicia are also possible. The indicia may also include an entirely or substantially opaque lens that is used when the vehicle is not in service.

The replaceable lens may comprise a plastic backing, with a retroreflective material having the indicia printed thereon. A clear layer (overlaminate) may be added to protect the front surface of the lens.

In some embodiments, the replaceable lens may further include a plurality of inset magnets. An inner face of the lens frame 120 may include a plurality of corresponding magnets located at positions generally directly facing the plurality of inset magnets when the lens 300 is placed within the sign device 100. The inset magnets and the corresponding magnets of the lens frame 120 may therefore allow for easier alignment between the lens 300 and the lens frame 120 and securement of the lens 300 to the lens frame 120. The magnetic force between the inset magnets and corresponding magnets of the lens frame 120 may be such that it can withstand vibrations of a vehicle in operation or the opening or closing of the sign device 100. At the same time, the magnetic force may be such that it is relatively easily overcome by an external force purposefully being applied on the lens 300. For example, the lens 300 may additionally have a catch opening through which an external object, such as a user's finger or a hooking tool, may be received. The external object may exert a pulling force on the lens 300, which may easily overcome the magnetic force, thereby releasing the lens 300 from the lens frame 120.

As illustrated, the opening 121 allows visibility of the indicia 312. The lens 300 is secured in the sign device 100 between the mounting frame 110 and the lens frame 120 and may additionally be secured to the lens frame 120, for example via magnets or other means discussed above. The latch mechanism is engaged to ensure that the lens frame 120 is held in the closed position, and also allows the lens frame to be relatively easily moved between its open and closed configurations. Specifically, in the illustrated embodiment, the latch mechanism enables the lens frame 120 to be locked in its closed position without the use of permanently fixed or difficult-to-remove components, such as bolts or screws. Accordingly, replacement of the lens 300 with another lens configured to fit in the sign device 100 may be done without significant time and effort, and without using tools that would normally be required for releasing and securing components such as bolts, screws, washers, nuts, etc.

Additional embodiments of the sign device will now be described with like features given like reference numerals, but with the additional of an "a" or "b" to denote the additional embodiment.

Figure 8:
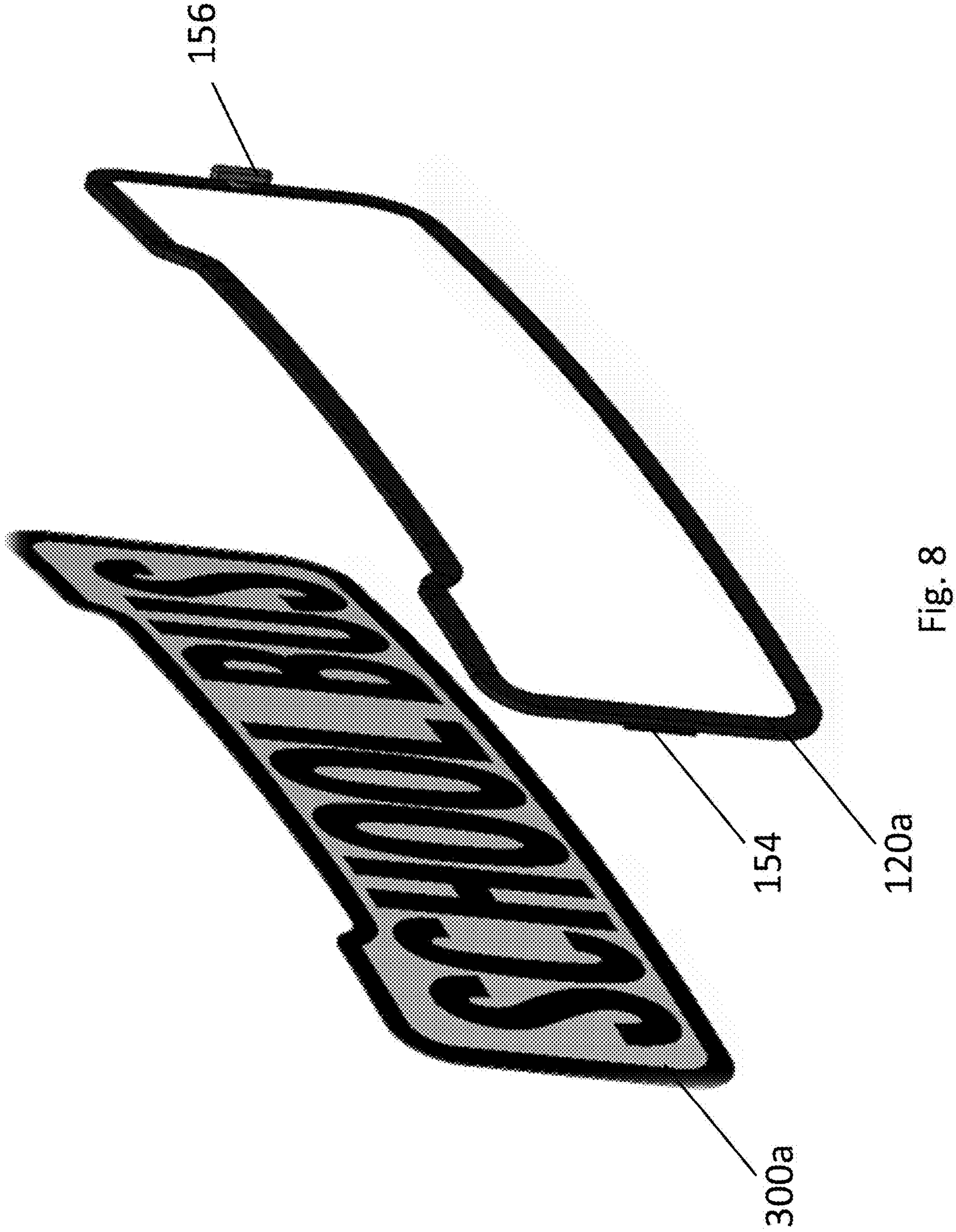
FIG. 8 is a perspective view of a lens and lens frame according to another embodiment of the present disclosure.

FIG. 8 depicts another embodiment where a replaceable lens 300*a* is received within a lens frame 120*a* and possibly retained therein using magnets, retention portions as described above, or other methods. The lens frame 120*a* includes a tab 154 on a first side and a rotatable latch 156 on a second, opposite side. The lens frame 120*a* may be connected and secured to a mounting frame 110*a* positioned on an exterior surface of a vehicle, such as a school bus. The mounting frame 110*a* secures a light box, such as the light box 112, and includes a recessed portion 158 (see in FIGS. 9 and 10) that has a shape matching the outline of the lens frame 120*a* to receive the lens frame 120*a*.

Figure 11:
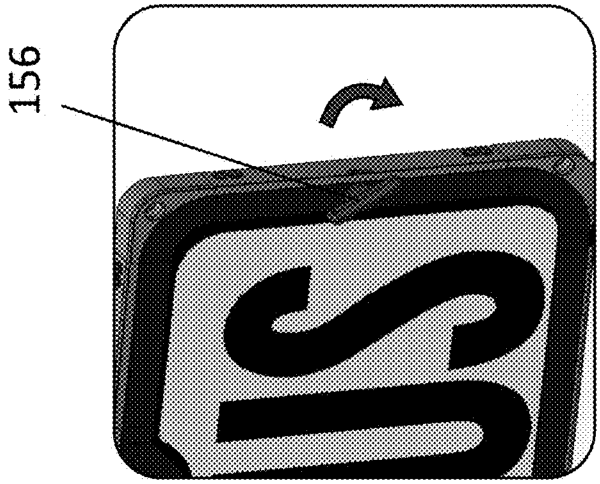
FIGS. 9 to 11 show a sequence of steps for closing a sign device according to the embodiment of FIG. 8.
Figure 10:
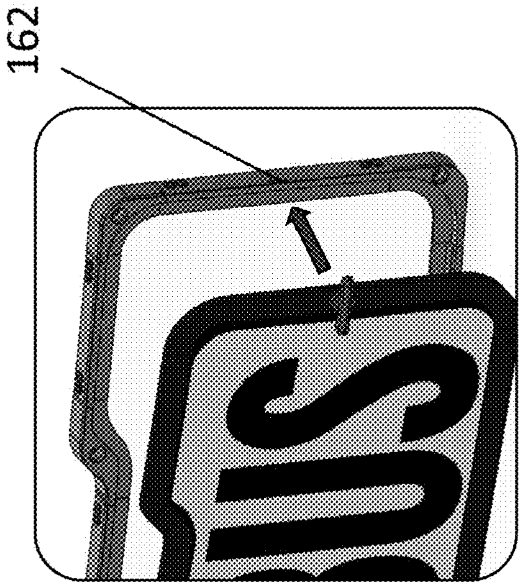
Figure 9:
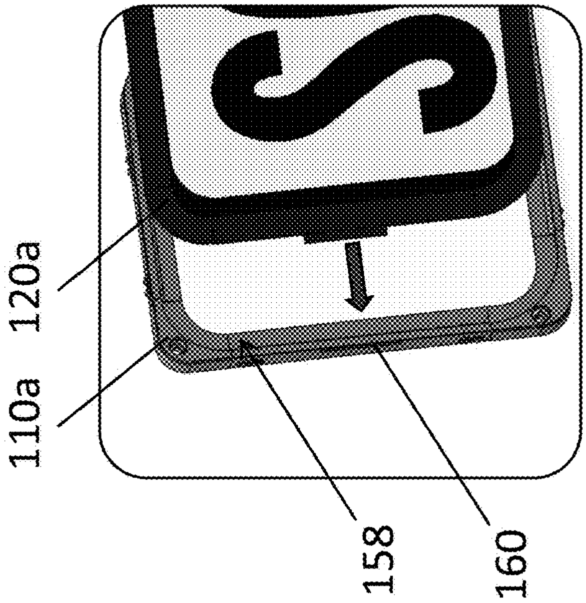
Figure 12:
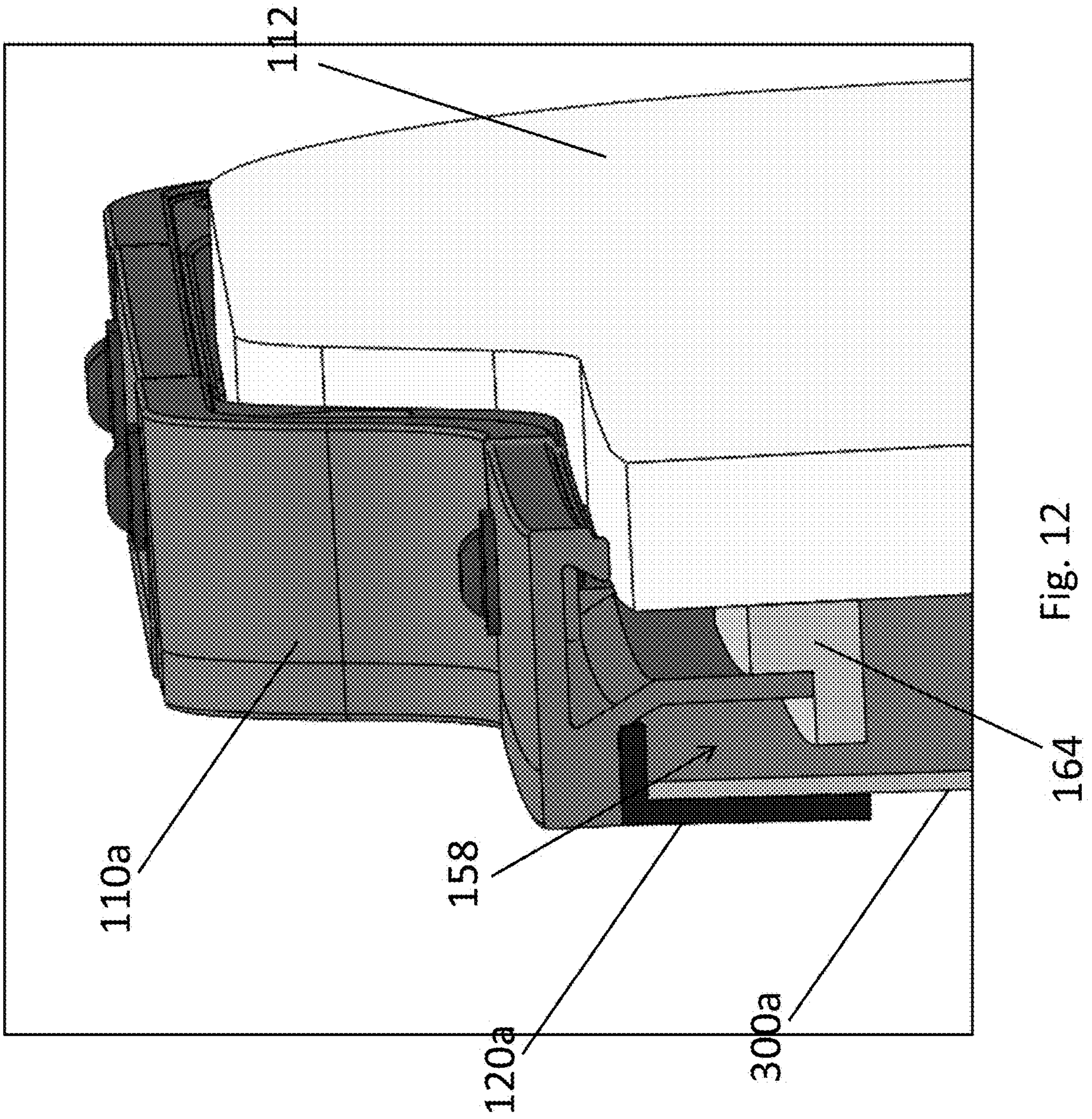
FIG. 12 is a partial sectional view of the embodiment of FIGS. 9 to 11.

As shown in the sequence in FIGS. 9 to 11, the tab 154 is first inserted into a corresponding and complementary opening or slot 160 in the mounting frame 110*a*, the lens frame 120*a* is laid onto the mounting frame 110*a* and then the latch 156 is rotated and secured to a corresponding latch opening 162 in the mounting frame 110*a*.

As such, the lens frame 120*a* may be moved between an open position, i.e. separate from the mounting fame, to a closed position, i.e. connected to the mounting frame, such that the lens 300*a* can be backlit by the light box 112.

To seal the open space 115*a* between the lens 300*a* and the light box 112, a gasket or other compressible sealing materials, such as foam tape 164, may be positioned between the two and compressed, akin to the embodiment shown in respect of FIGS. 1 to 7. Specifically, the force applied when the rotatable latch 156 is rotated to secure the lens frame 120*a* to the mounting frame 110*a* may aid in compressing the foam tape 164 between the replaceable lens 300*a* and the light box 112, resulting in an improved seal.

Figure 13:
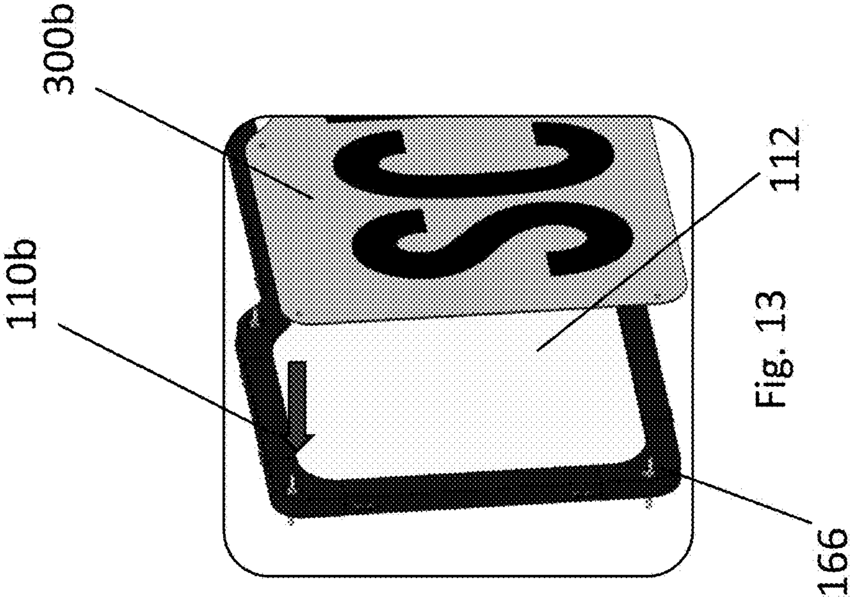
FIGS. 13 to 15 show a sequence of steps for closing a sign device according to another embodiment of the present disclosure.
Figure 14:
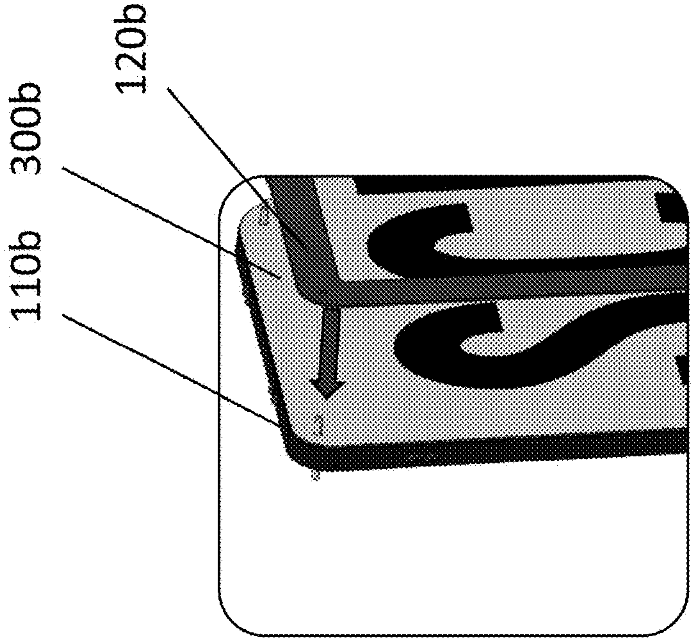
Figure 15:
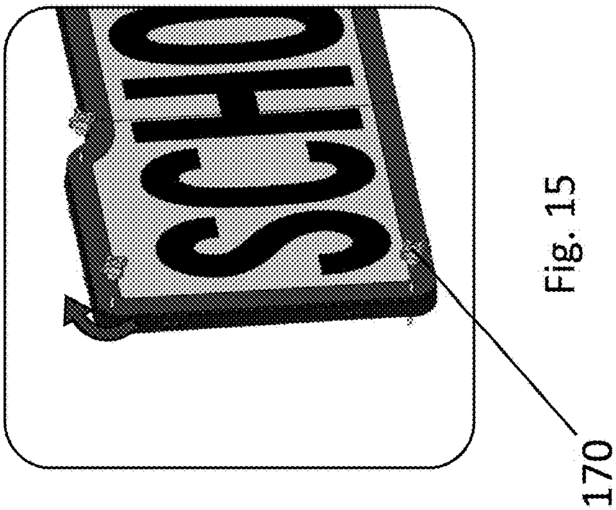
Figure 16:
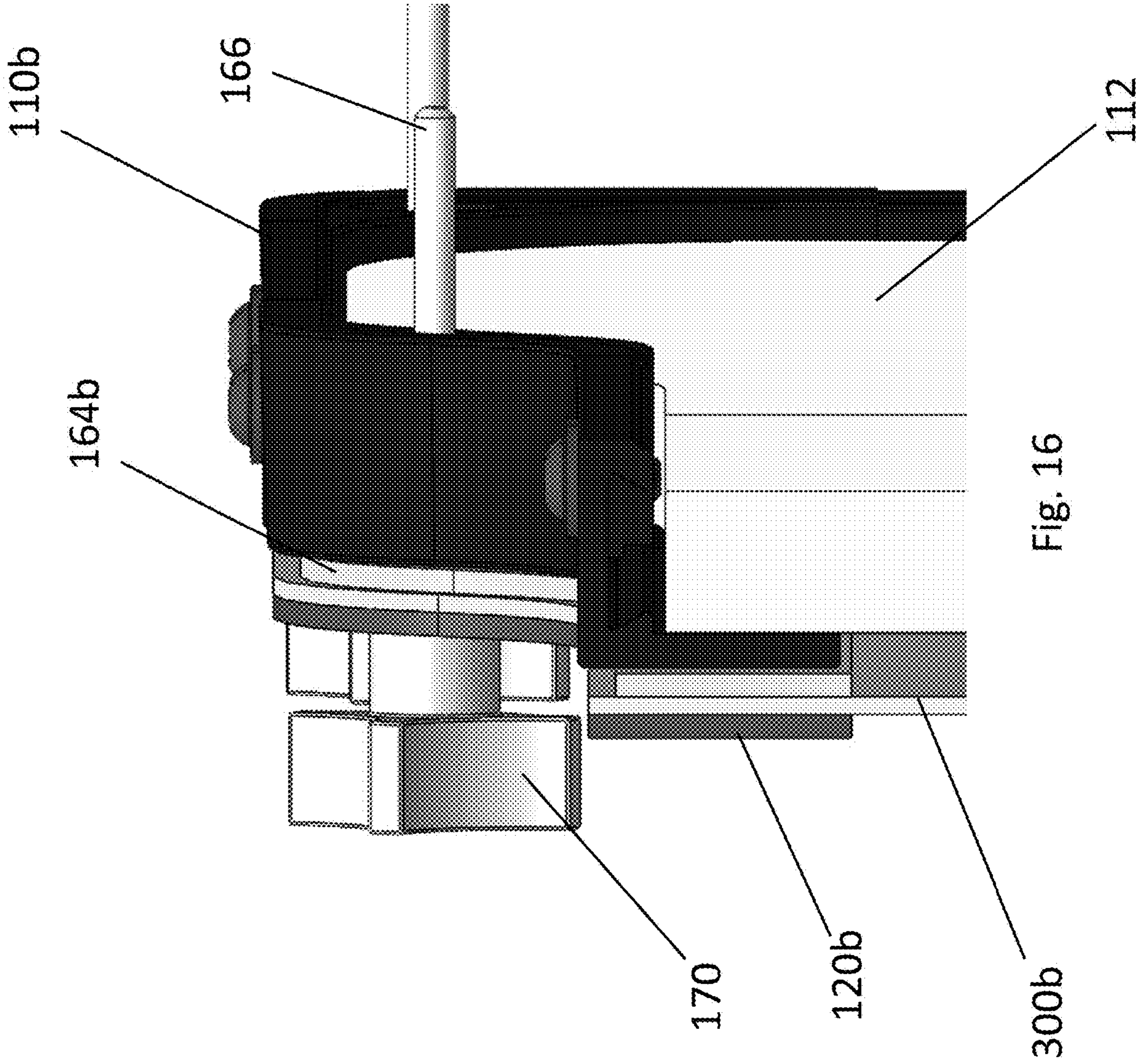
FIG. 16 shows a partial sectional view of the embodiment of FIGS. 13 to 15.

Other embodiments of a sign device according to the present disclosure are also possible. For example, referring to FIGS. 13 to 15, a mounting frame 110*b* that is used to mount a light box 112 to a surface of the bus may include one or more bolts 166 extending from the frame. A replaceable lens 300*b* includes a number of receiving holes corresponding to the number of bolts 166. The lens 300*b* may be mounted on the bolts 166. A lens frame 120*b* having holes for the bolts 166 that line up with the holes in the replaceable lens is mounted over the lens 300*b*. Nuts 170 are then fastened onto the bolt to secure the lens frame 120*b* to the lens 300*b* and the lens 300*b* to the mounting frame 110*b*.

As such, the lens frame 120*b* may be moved between an open position, i.e. separate from the mounting fame, to a closed position, i.e. connected to the mounting frame, such that the lens 300*ba* can be backlit by the light box 112.

To seal an open space 115*b* between the lens 300*b* and the light box 112, a gasket or other compressible sealing materials, such as foam tape 164*b*, may be positioned between the two and compressed, akin to the embodiment shown in respect of FIGS. 1 to 7. The foam tape 164*b* may be provided on the lens 300*b* and/or the mounting frame 110*b*. Tightening the nuts 170 also applies compression. The lens frame 120*b* may aid in distributing the compression forces more evenly across the contact between the frame cover 168 and the lens 300*b*, resulting in an improved seal.

Yet other embodiments of the sign device are possible. For example, reference to the "lens frame" in the present disclosure should be understood to refer to any type of cover, frame, or other element that can be used to couple the lens to the mounting frame and/or light box. In some embodiments, the replaceable lens and lens frame may be integral. Unless specified all references to lens and/or lens frame in the present disclosure should be understood to refer to embodiments where the lens and lens frame are integral or otherwise affixed to each other.

Figure 17:
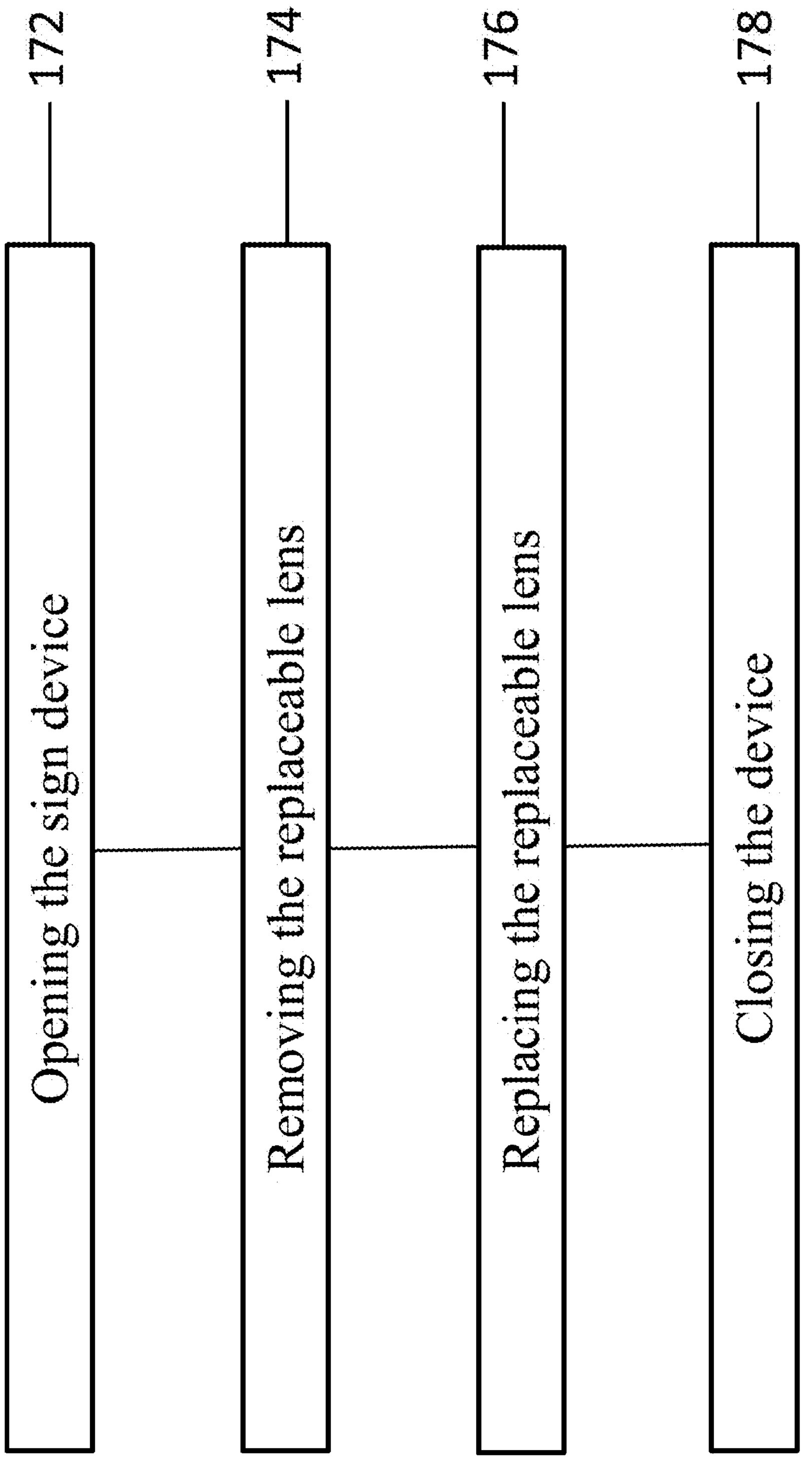
FIG. 17 shows steps in one embodiment of a method according to the present disclosure.

According to the present disclosure, methods of replacing a lens of a sign device are also disclosed. With reference to FIG. 17, one embodiment of a method according to the present disclosure includes a first step 172 of opening a sign device, a second step 174 of removing a lens, a third step 176 of replacing the lens with a different lens, and a fourth step 178 of closing the device. Closing the device may comprise engaging a weathertight seal to seal a space between the lens and the light box.

In some embodiments, opening the sign device includes moving the lens and/or the lens frame from a closed position to an open position.

In some embodiments, opening the sign device includes releasing a latch mechanism that secures the lens to the light box and/or to the mounting frame.

In some embodiments, opening the sign device includes pivoting the lens and/or the lens frame away from the light box.

In some embodiments, removing the lens includes removing the lens from one or more retention portions of the lens frame.

In some embodiments, engaging the seal includes applying compression to the seal.

In some embodiments, engaging the seal includes securing the lens and/or the lens frame to the light box and/or to the mounting frame Although the present disclosure has been described with reference to specific features and embodiments, various modifications and combinations may be made thereto without departing from the disclosure. The description and drawings are, accordingly, to be regarded simply as an illustration of some embodiments of the disclosure, the invention being defined by the appended claims, and are contemplated to cover any and all modifications, variations, combinations or equivalents that fall within the scope of the present disclosure. Therefore, although the present disclosure and its advantages have been described in detail, various changes, substitutions, and alterations may be made herein without departing from the disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Numerous specific details have been set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a nonexclusive inclusion. For example, a composition, a process, method, article, or apparatus that comprises a list of elements is not necessarily limited to only those elements but may include other elements not expressly listed or inherently present therein.

As used herein the terms "approximately," "about," "substantially" and variations thereof are intended to include not only the exact value qualified by the term, but to also include some slight deviations therefrom, such as deviations caused by measuring error, manufacturing tolerances, wear and tear on components or structures, stress exerted on structures, and combinations thereof, for example.

Use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, it will be understood that features of one embodiment may be combined with features of other embodiments, even if not expressly recited or described as a combination.

The invention claimed is:

1. A sign device, the device comprising:

a mounting frame for mounting a light box to a surface;

a lens frame for coupling to the mounting frame and movable between an open position and closed position; and a removable lens retainable by the lens frame such that, when the light box is activated with the lens frame in the closed position, the light box back lights the lens, wherein, in the closed position, a weathertight seal seals a space between the lens and the light box.

2. The device of claim 1, wherein the lens frame comprises one or more retention portions for retaining the lens.

3. The device of claim 2, wherein the one or more retention portions are configured to provide one or more gaps between a rear and a front of the lens frame, the gaps being sized complementary to a thickness of the lens.

4. The device of claim 3, wherein the lens is removably received in the one or more gaps.

5. The device of claim 1, wherein the lens frame is coupled to the mounting frame by a hinge and pivots between the closed and open positions.

6. The device of claim 1, wherein the seal is positioned on the mounting frame.

7. The device of claim 6, wherein the seal is positioned on a portion of the mounting frame extending into the space between the lens and the light box.

8. The device of claim 1, wherein the seal contacts the light box when the light box is mounted to the surface and contacts the lens in the closed position.

9. The device of claim 1, wherein the seal extends around the space between the lens and the light box.

10. The device of claim 1, wherein the lens frame is capable of being secured to the mounting frame in the closed position such that the seal is subject to compression.

11. The device of claim 1, further comprising a latch mechanism to secure the lens frame to the mounting frame in the closed position.

12. The device of claim 11, wherein the latch mechanism comprises one or more spring-loaded latches.

13. A method for replacing a lens of a sign device, the lens being retained by a lens frame, the lens frame being couplable to a light box and/or a mounting frame of the light box, the method comprising:

opening the sign device;

removing the lens;

replacing the lens with a different lens; and closing the device, thereby engaging a weathertight seal to seal a space between the different lens and the light box.

14. The method of claim 13, wherein opening the sign device comprises moving the lens and/or the lens frame from a closed position to an open position.

15. The method of claim 13, wherein opening the sign device comprises releasing a latch mechanism that secures the lens to the light box and/or to the mounting frame.

16. The method of claim 13, wherein opening the sign device comprises pivoting the lens and/or the lens frame away from the light box.

17. The method of claim 13, wherein removing the lens comprises removing the lens from one or more retention portions of the lens frame.

18. The method of claim 13, wherein engaging the seal comprises applying compression to the seal.

19. The method of claim 13, wherein engaging the seal comprises securing the lens and/or the lens frame to the light box and/or to the mounting frame.

20. A sign device, the device comprising:

a light box for mounting to a surface of a vehicle;

a lens frame for coupling to the light box and movable between an open position and closed position such that, when the light box is activated with the lens frame in the closed position, the light box illuminates a lens, wherein, in the closed position, a weathertight seal seals a space between the lens and the light box.

* * * * *